United States Patent
Lee et al.

(10) Patent No.: US 8,037,460 B2
(45) Date of Patent: Oct. 11, 2011

(54) CODE PERSISTENCE AND DEPENDENCY MANAGEMENT FOR DYNAMIC COMPILATION IN A DATABASE MANAGEMENT SYSTEM

(75) Inventors: Robert H. Lee, Sunnyvale, CA (US); David Unietis, San Francisco, CA (US); Mark Jungerman, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1249 days.

(21) Appl. No.: 11/698,634

(22) Filed: Jan. 26, 2007

(65) Prior Publication Data

US 2008/0184212 A1   Jul. 31, 2008

(51) Int. Cl.
*G06F 9/45* (2006.01)

(52) U.S. Cl. ........ 717/136; 717/139; 717/140; 717/146; 717/148

(58) Field of Classification Search .......................... None
See application file for complete search history.

(56) References Cited

U.S. PATENT DOCUMENTS

| | | | |
|---|---|---|---|
| 4,588,985 A | | 5/1986 | Carter et al. |
| 5,504,885 A | * | 4/1996 | Alashqur ...................... 717/141 |
| 6,205,440 B1 | * | 3/2001 | Nusbickel ..................... 707/769 |
| 6,434,685 B1 | | 8/2002 | Sexton et al. |
| 6,484,313 B1 | * | 11/2002 | Trowbridge et al. .......... 717/146 |
| 6,519,594 B1 | | 2/2003 | Li |
| 6,782,532 B1 | | 8/2004 | Sexton et al. |
| 6,829,761 B1 | | 12/2004 | Sexton et al. |
| 6,854,114 B1 | | 2/2005 | Sexton et al. |
| 6,973,646 B1 | | 12/2005 | Bordawekar et al. |
| 7,032,216 B1 | * | 4/2006 | Nizhegorodov .............. 717/152 |
| 7,788,314 B2 | | 8/2010 | Holt |
| 2001/0047436 A1 | | 11/2001 | Sexton et al. |
| 2002/0112226 A1 | * | 8/2002 | Brodersen et al. ............ 717/140 |
| 2002/0144240 A1 | * | 10/2002 | Lueh et al. .................... 717/136 |
| 2003/0093778 A1 | * | 5/2003 | Bak et al. ...................... 717/140 |
| 2004/0003380 A1 | * | 1/2004 | Fedorov ....................... 717/148 |

(Continued)

OTHER PUBLICATIONS

"Enhancing Source-Level Programming Tools with an Awareness of Transparent Program Transformations", Myoungdyu Song et al., Oct. 2009, pp. 301-319, < http://delivery.acm.org/10.1145/1650000/1640112/p301-song.pdf?key1=1640112&key2=7073135031&coll=DL&dl=ACM&ip=151.207.242.4&CFID=22831650&CFTOKEN=15468244 >.*

(Continued)

*Primary Examiner* — Thuy Dao
*Assistant Examiner* — Ziaul A. Chowdhury
(74) *Attorney, Agent, or Firm* — Silicon Valley Patent Group LLP; Omkar Suryadevara

(57) ABSTRACT

Software expressed in an intermediate level language is stored into a database and interpreted in a virtual machine in a database management system. A dynamic compilation process in the database management system asynchronously converts the software into native code when predetermined conditions are met. Thereafter, the compilation process persists the native code into the database. At the time of persisting the native code, the compilation process also stores in the database, an indication of any properties that are used in compilation of the native code. At run time, when the native code needs to be executed, the virtual machine checks if the indication stored in the database matches a new indication of the constants, and if they do the persisted code is executed or else the persisted code is invalidated. The persisted code is also invalidated when a new version of ILL software is stored into the database.

16 Claims, 7 Drawing Sheets

U.S. PATENT DOCUMENTS

| | | | |
|---|---|---|---|
| 2004/0019886 A1 | 1/2004 | Berent et al. | |
| 2004/0031022 A1* | 2/2004 | Kabasawa et al. | 717/139 |
| 2004/0044995 A1 | 3/2004 | Hickson | |
| 2004/0054994 A1* | 3/2004 | Demsey et al. | 717/148 |
| 2004/0168028 A1 | 8/2004 | Cierniak | |
| 2004/0168162 A1* | 8/2004 | Park et al. | 717/166 |
| 2004/0210865 A1* | 10/2004 | Shimura | 717/100 |
| 2004/0230958 A1* | 11/2004 | Alaluf | 717/140 |
| 2004/0243989 A1* | 12/2004 | Owens et al. | 717/151 |
| 2006/0206884 A1 | 9/2006 | Creamer et al. | |
| 2007/0061787 A1* | 3/2007 | Trowbridge | 717/140 |

OTHER PUBLICATIONS

"Anatomy of a native XML base management system", Thorsten Fiebig et al., 2002, pp. 1-23, <http://delivery.acm.org/10.1145/770000/764202/20110292.pdf?key1=764202&key2=2925135031 & coll=DL&dl=ACM&ip=151.207.242.4& CFID=22831650& CFTOKEN=15468244 >.*

"Integrating Programming Languages & Databases: What's the Problem", William R. Cook et al., 2005, pp. 1-18, < http://www.cs.utexas.edu/users/wcook/Drafts/2005/PLDBProblem.pdf >.*

"Orthogonal Persistence as an Implementation Platform for Software Development Environments", G.N.C. Kirby et al., 1997, pp. 1-12, < http://www.cs.st-andrews.ac.uk/files/publications/download/KCC+97b.pdf >.*

U.S. Appl. No. 11/698,629.

U.S. Appl. No. 11/698,638.

Final Rejection dated Feb. 11, 2011 in U.S. Appl. No. 11/698,629, 16 pages.

Oracle® Database, Java Developer's Guide, 10g Release 1 (10.1), Part No. B12021-02, Jun. 2004, 218 pages.

Dmitriev, M. "Towards Flexible and Safe Technology for Runtime Evolution of Java Language Applications", In Proceedings of the Workshop on Engineering Complex Object—Oriented Systems for Evolution, in association with OOPSLA 2001 International Conference, 8 pages.

Developing Stored Procedures In Java™, An Oracle Technical White Paper, Apr. 1999, 19 pages.

Oracle8i, Java Stored Procedures Developer's Guide, Release 2 (8.1.6), Part No. A81358-01, Dec. 1999, 122 pages.

Non Final Rejection dated Aug. 19, 2010 in U.S. Appl. No. 11/698,629, 13 pages.

Amendment/Req. Reconsideration—After Non-Final Reject (1page) including Specification (3 pages), Claims (3 pages) and Applicant Arguments/Remarks made in an Amendment (6 pages) dated Nov. 19, 2010 in U.S. Appl. No. 11/698,629.

* cited by examiner

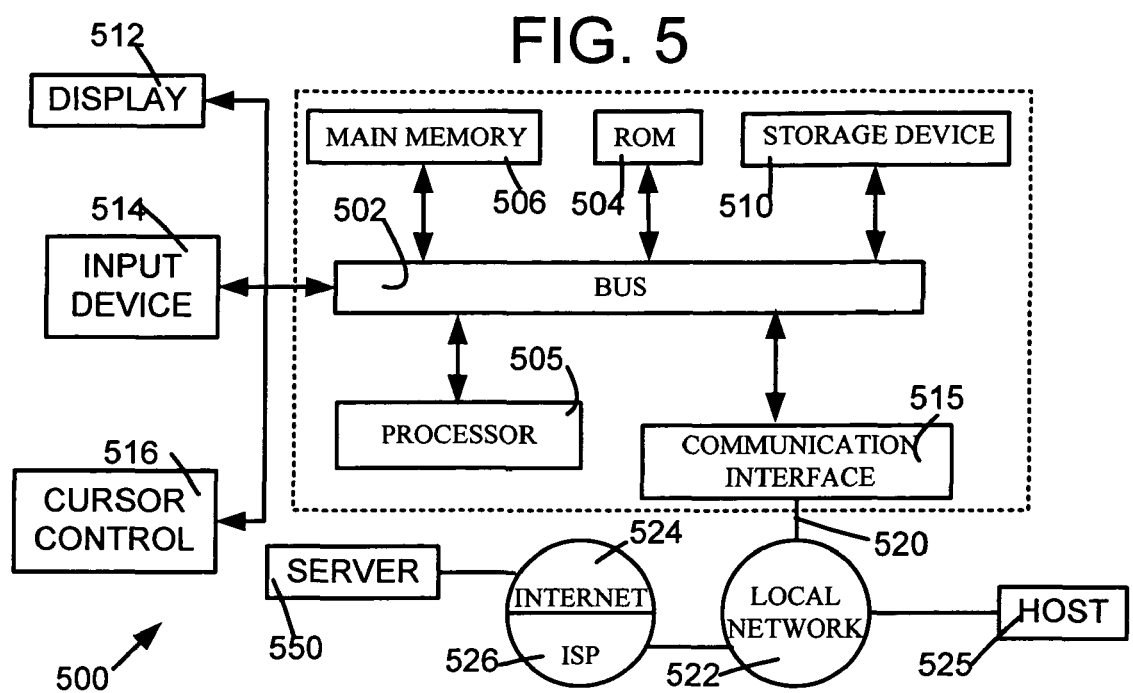

CODE PERSISTENCE AND DEPENDENCY MANAGEMENT FOR DYNAMIC COMPILATION IN A DATABASE MANAGEMENT SYSTEM

CROSS-REFERENCE TO RELATED APPLICATIONS

This application is related to and incorporates by reference herein in its entirety, a commonly-owned and concurrently filed U.S. application Ser. No. 11/698,629, entitled "ASYNCHRONOUS DYNAMIC COMPILATION BASED ON MULTI-SESSION PROFILING TO PRODUCE SHARED NATIVE CODE" by Robert H. Lee et al.

This application is also related to and incorporates by reference herein in its entirety, a commonly-owned and concurrently filed U.S. application Ser. No. 11/698,638, entitled "CODE GENERATION IN THE PRESENCE OF PAGED MEMORY" by Robert H. Lee et al.

BACKGROUND

U.S. Pat. No. 6,854,114 granted to Harlan Sexton et al is incorporated by reference herein in its entirety, as background. In this patent, Sexton describes multiple VM instances accessing a shared area. Referring to FIG. 1 attached hereto, three clients have established three sessions through a server. In session 1, a call that involves services provided by the virtual machine is currently being processed by a system thread using VM instance 1. In session 3, a call that involves services provided by the virtual machine is currently being processed by a system thread using VM instance 3. Both VM instance 1 and VM instance 3 share access to the shared state area, which in the illustrated embodiment includes data for Java class X. In session 2, no call is currently active. The call memory associated with any previous call has been discarded. Only the session memory of VM instance 2 remains allocated. Because session 2 is not currently processing a call that makes use of VM instance 2, VM instance 2 is not currently assigned to any system thread. The various VM instances instantiated within the server may actually be created and run in either separate processes, or using system threads.

VM instances of the type described above typically use a Java virtual machine interpreter (such as interpreter 110 in FIG. 2) which is responsible for interpreting Java byte codes. FIG. 2 is described in U.S. Pat. No. 7,032,216 granted to Dmitry Nizhegorodov, which patent is hereby incorporated by reference herein in its entirety, as background. In this patent, Nizhegorodov states that, in addition to the byte codes, a native compiler produces translated code 120, which is also loaded in the virtual machine. Preferably, the translated code 120 is configured to interact with interpreter 110 to support an execution model that mixes byte-interpreted and natively compiled classes. Thus, routines in translated code 120 may call routines that are interpreted, and interpreted routines may call translated code 120 routines, thereby providing call interoperability. Virtual machine services 130 are provided for supplying such services as dynamic memory management and garbage collection. Translated code 120 is generated to use the API of virtual machine services 130 (which is used by interpreter 110) by passing the context parameter or handle to the routines of the virtual machine services 130.

Run-time environment 140 of FIG. 2 provides base functionality of the virtual machine, interfacing with the underlying operating system and relational database system. Run-time environment 140 may also include a meta-object system such as that described in U.S. Pat. No. 6,782,532 granted to Sexton, et al., which patent is also hereby incorporated by reference herein in its entirety, as background. Accordingly, translated code 140 is configured to interact with run-time environment 140 in the same way as virtual machine services 130, for example by laying out objects in the same way and using the same meta-object system. Runtime environment 140 of the type described above is normally responsible for managing memory for objects that are created and destroyed during the execution of a program.

One technology employed by several Java Virtual Machines (JVMs) to run Java code is dynamic compilation, which is also called Just-in-Time (JIT) compilation. In such a scenario, Java bytecodes are compiled into native machine code, on demand. This allows Java bytecodes to be interpreted by the JVM until they are found to be heavily used at which time they are compiled by the JIT compiler. However, to the inventors knowledge, a JIT compiler normally discards any native code that has been dynamically created, when an instantiation of the virtual machine (VM) ends. Although discarding the native code is simpler, it does require at least some of the same code to be recompiled in a new instantiation that may start up at a later time. To share compiled code across temporally-spaced apart VM instantiations, the inventors note that it is necessary to persist the compiled code.

U.S. Pat. No. 6,973,646 granted to Bordawekar et al. is incorporated by reference herein in its entirety as background. Bordawekar describes generating "persistent code images" prior to program execution based on static compilation or dynamic compilation from a previous run, and then, adapting those images during program execution. According to Bordawekar, the code images are stored a file system in files of extension ".qnx". Note that, Bordawekar requires generation of adaptation annotations and their use in adapting the persisted code images to an execution context, followed by generating executable (i.e. native) code prior to its execution. See Bordawekar's Abstract. Bordawekar's adaptation is further described in column 10, wherein a sample instruction to load "stats.count" is adapted to yield six instructions shown at lines 40-50 in column 10 of Bordawekar's patent. The current inventors find that such adaptation of instructions from a code image by Bordawekar has the benefit of generating more optimal code in some situations (e.g. inserting extra code only for class initialization), but has the drawback of being slow to start execution.

SUMMARY

In accordance with the invention, a computer is programmed to automatically compile and persist machine instructions into a database, after corresponding software expressed in an intermediate level language (ILL) is stored into the database and interpreted in a virtual machine in a database management system through which the database is accessed. Specifically, the computer automatically invokes a dynamic compiler in the database management system, to convert one or more portions of the ILL software (such as a single method in a Java class) into native code that contains machine instructions, when a predetermined condition is satisfied (e.g. a statistic on the number of times execution of the ILL software portion(s) exceeds a preset threshold). After such compilation, the computer persists (i.e. stores) the native code into the database, and when necessary executes the native code via the virtual machine instead of interpreting the corresponding ILL software. Note that when the native code is retrieved from the database, it is executed without any change in the machine instructions therein in accordance with the invention. In certain embodiments wherein the native code spans across page boundaries, memory addresses therein are fixed up prior to execution, but such address fix up is not required in other embodiments.

At the time of persisting the native code, the computer also stores in the database, an indicator (e.g. a hash) of several properties of the virtual machine (VM) and/or database management system (DBMS) that are used in compiling the ILL software portion(s) into native code. Also at the time of persisting the native code, the computer records in the database one or more dependencies of this native code on other native code (for future use in invalidating this native code based on the dependencies). The persisted native code is executed when necessary, as long as the indicator stored in the database matches a new indicator of these properties (e.g. a new hash value that is computed on each startup of the database), because the match indicates continuing compatibility of the native code with the current VM and DBMS. However, as soon as an indicator (indicative of a property used by the native code) fails to match, the native code is invalidated and the computer returns to interpreting the ILL software portion(s), which is/are eventually re-compiled (in due course) when the predetermined condition is again satisfied. The indicators typically fail to match if there is a change in one or more properties (of the VM and/or DBMS) being indicated. Accordingly, in certain embodiments, when changes to VM and/or DBMS do not affect the indicator, persisted native code (which uses the unchanged properties) continues to be executed (whenever necessary), which avoids unnecessary re-compilation, and its related latency. The persisted native code is also invalidated when a new version of the ILL software is stored into the database.

In some embodiments, a dependency manager in the database management system automatically resolves dependencies in the ILL software to invalidate any dependent methods (whenever a new method is stored into the database). On such storing, the database management system also re-resolves dependencies and automatically stores into the database updated versions of the ILL software containing the dependent methods. The database management system also invalidates the native code of the dependent methods, which are eventually re-compiled as discussed above.

BRIEF DESCRIPTION OF THE DRAWINGS

FIG. 5 illustrates, in a high level block diagram, hardware included in a computer that may be used to perform the methods of FIGS. 4A-4C in some embodiments of the invention.

DETAILED DESCRIPTION

Figure 1:
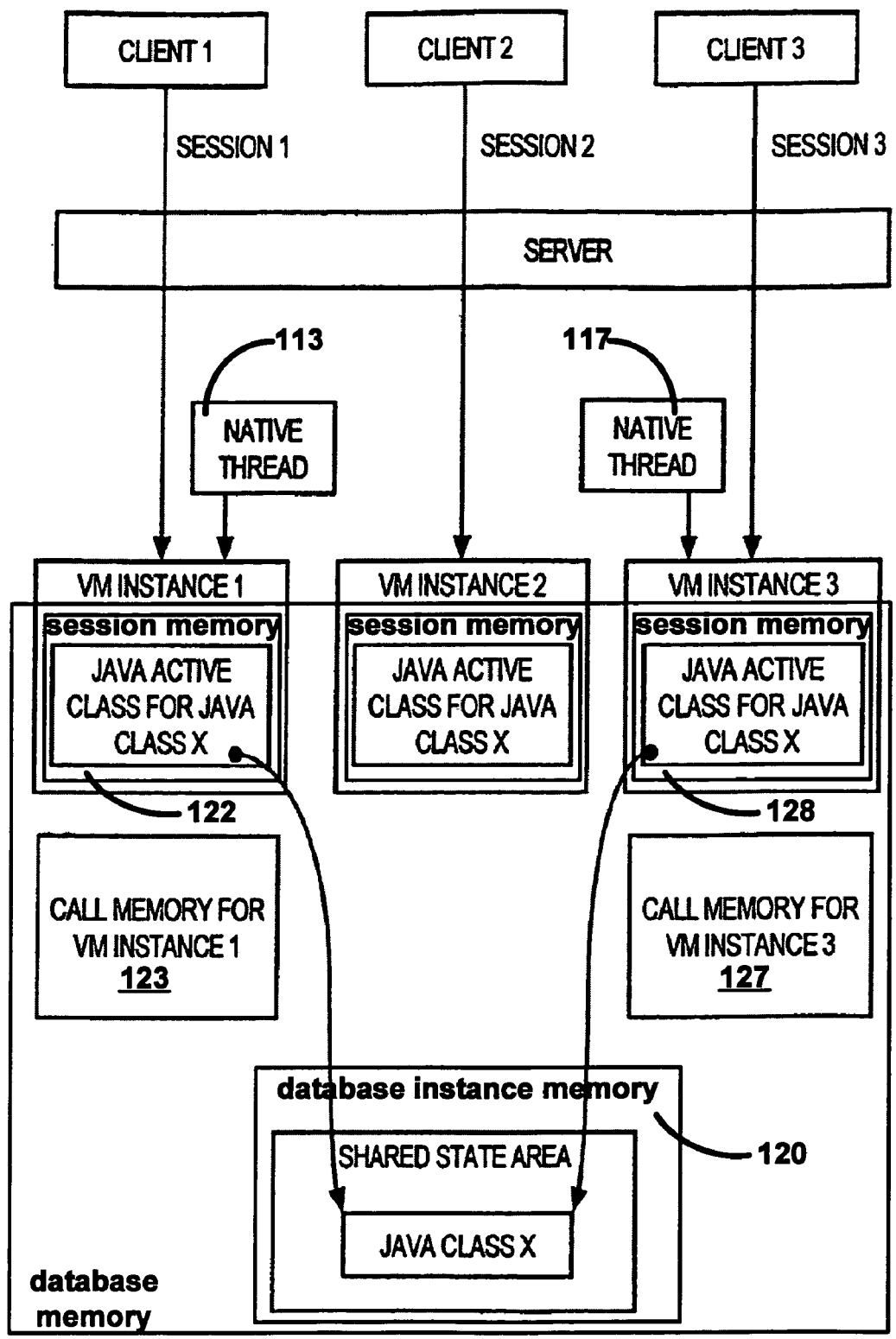
FIGS. 1 and 2 illustrate, in block diagrams, memory management systems of the prior art.

In accordance with the invention, a computer 200 executes various processes (also called "database processes") of a database management system 270, such as a server process 217 and a kernel process 210 both of which can invoke a virtual machine (VM), such as the Java VM that is included within system 270. Note that the VM (in system 270) which is being used in accordance with the invention does not work with files and instead it works with schema objects in database 230, and for this reason all software to be executed by the VM must be present in a table of database 230. In several embodiments, server process 217 and kernel process 210 are identical to one another in all respects, and are just two of several such processes in database management system 270.

Database management system 270 also contains an interpreter (accessible to the VM) which can execute software expressed in an intermediate level language (ILL). One example of ILL software is Java bytecodes. Such ILL software for one or more methods of a class is stored in a database, for execution by the interpreter in the VM, when performing the method(s). During interpreted execution of ILL software, whenever a predetermined condition is satisfied (e.g. a statistic on the number of times a method in the ILL software has been interpreted exceeds a preset threshold), database management system 270 automatically performs compilation of a class (which contains the method) asynchronously (via operation 212 performed in kernel process 210).

Figure 3A:
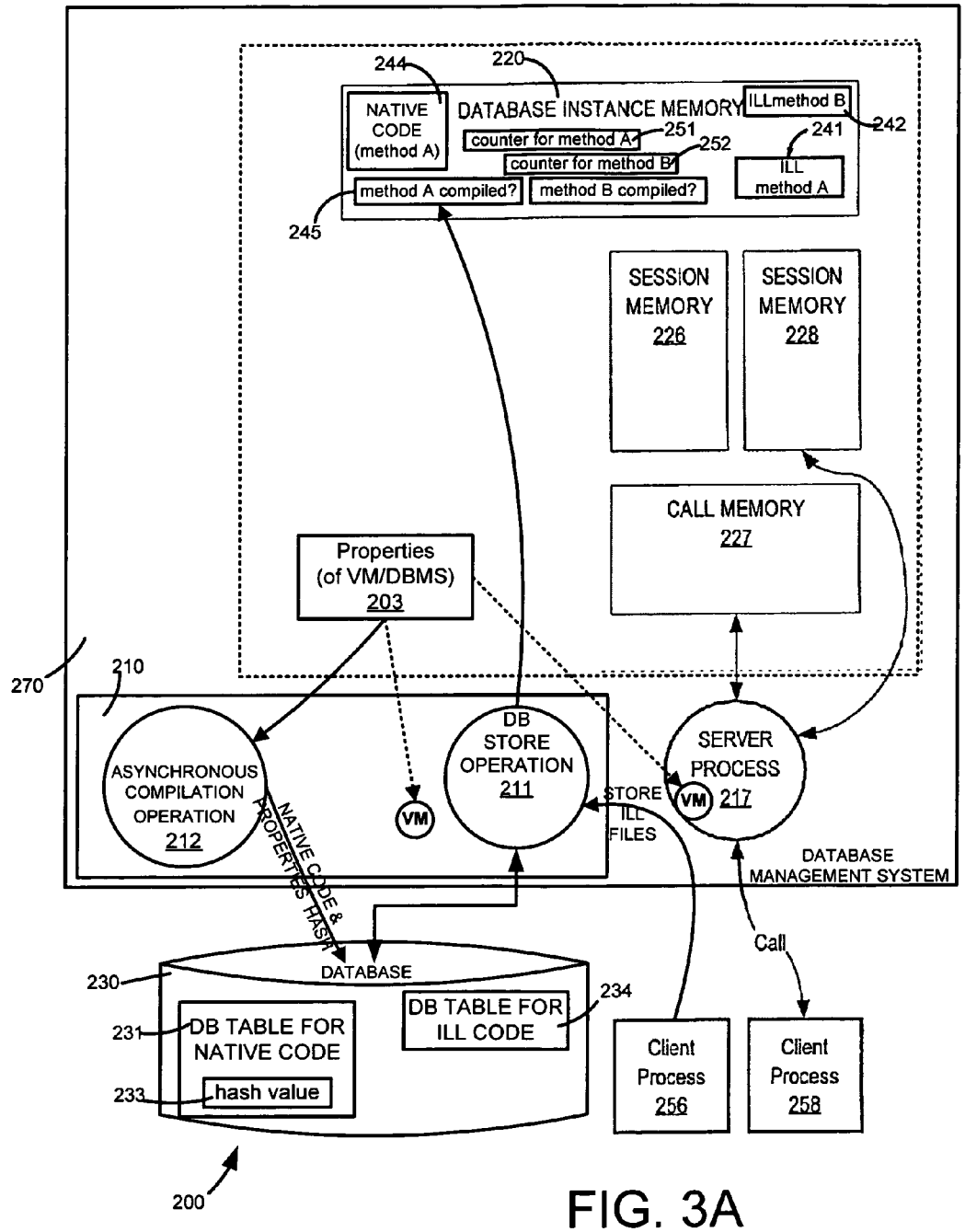
FIG. 3A illustrates, in a high-level data flow diagram, a system and method in accordance with the invention, to persist machine instructions in a database.

In FIG. 3A, method A is being currently executed by interpretation of an ILL form of this method in software 241 which is present in a shared memory 220 of a database instance of the database management system 270. In this embodiment, compilation operation 212 is performed in a database kernel process 210 which asynchronously checks to see if interpreted execution of method A has met a predetermined condition (e.g. executed more than 10,000) and when this happens, compilation operation 212 asynchronously operates a compiler for ILL software 241 (such as a Just-In-Time compiler for Java). In this manner, the compiler in database management system 270 receives ILL software 241 as input and automatically generates machine instructions (also called "native code") for method A that can be directly executed (without interpretation and without Bordawekar's adaptation to generate extra instructions), even if interpreted execution of the same method A is occurring simultaneously.

Figure 2:
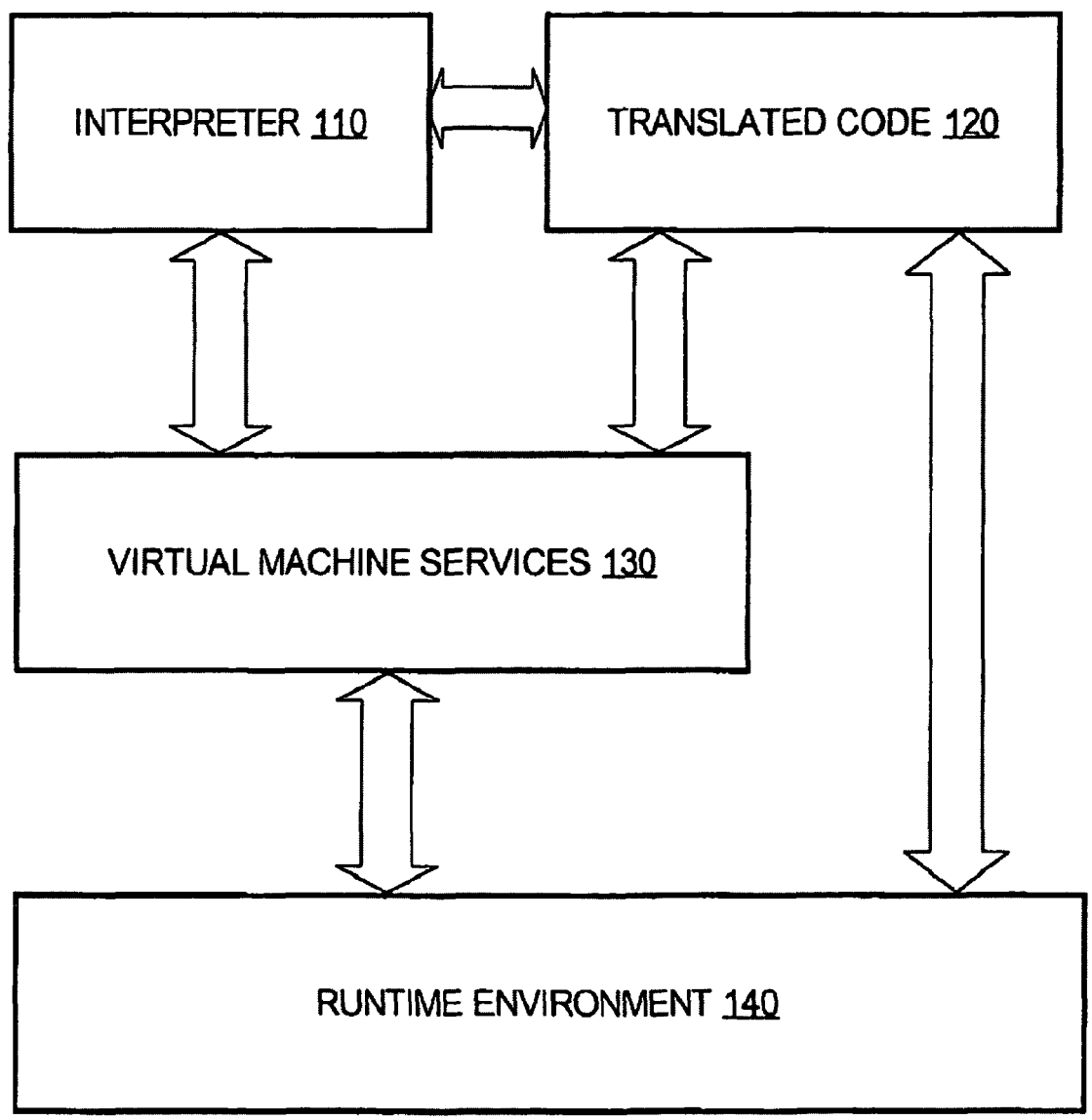

Note also that in embodiments of the type illustrated in FIG. 3A, the interpreter in the VM in database management system 270 maintains in shared memory 220, a count of the number of times each method is executed, for future use by compilation operation 212 as noted above. For example (1) whenever a method 241, 242 is invoked—its corresponding counter 251, 252 in memory 220 (FIG. 2A) is incremented, and whenever there is a backward branch in the method and (3) if there is a loop then on every iteration the corresponding counter is further incremented. The count is maintained in each counter (e.g. counters 251 and 252) across multiple sessions, so that any improvements from compilation by operation 212 accrue to a database instance as a whole, rather than to an individual session.

After compilation completes, operation 212 persists the native code, e.g. by invoking database kernel process 210 to store the native code in a table 231 of database 230. Note that execution of native code from table 231 does not require instruction selection, or code emission which are performed during Bordawekar's adaptation. For example, Bordawekar's adaptation requires selection of extra instructions as shown in column 10 at lines 40-50. And in this example, a single instruction shown at line 5 in column 10 of Bordawekar's patent may be thought of as a form of intermediate level code which is replaced by the multiple instructions in column 10 at lines 40-50, so the existing code stream cannot be used unchanged and instead a new code stream which includes Bordawekar's extra code (see column 10 lines 32-33) needs to be emitted. Therefore, Bordawekar's adaptation requires instruction selection and code emission at run time, both of which are eliminated in accordance with the invention as discussed next.

Specifically, at run time, machine instructions in the native code from table 231 are directly executed in accordance with the invention, after the native code is loaded into memory. In some embodiments of the invention a paged memory architecture is used by the database management system, and the native code which is persisted to database table 231, is stored therein as multiple code sequences, with each code sequence being sized to fit within a page of memory of a predetermined size. At run time, native code to be used in execution is regenerated from the multiple code sequences, by editing each code sequence to correct memory addresses therein as discussed in detail in the above-referenced U.S. patent application, Serl. No. 11/698,638. Note that in the just-described embodiments, the fix-up of memory addresses requires significantly less work at run time and therefore enables a method to start execution significantly faster than Bordawekar's adaptation which may require instruction selection and code emission. Note further that Bordawekar uses adaptation annotations that contain symbolic references, which are not required in accordance with the invention which emits machine instructions in native code that are directly executable as described herein.

Alternative embodiments of the invention do not use a paged memory architecture and hence do not require the just-described breakup of native code into page-sized code sequences, and also do not require the above-described editing of pre-existing destination addresses. Hence, in the alternative embodiments, the native code is directly executed after being loaded into memory, i.e. without any change whatsoever from its form as persisted into table 231.

Note that compilation of an ILL form of a method by kernel process 210 is performed asynchronously relative to interpreted execution of the same ILL form of the method by server process 217.

At the time of persisting native code to database 230 by kernel process 210, database management system 270 also sets a flag 245 in shared memory 220 (via compilation operation 211) to indicate to any database process that is currently executing that native code 244 for method A is available in database 230. Hence, the next time any process of database management system 270 prepares to start execution of method A, it finds flag 245 set, and loads native code 244 from table 231 of database 230, into database shared memory 220, and executes it therefrom.

At the time of persisting native code into table 231, compilation operation 212 of several embodiments is programmed to also store in database 230, a hash value 233 of several properties (e.g. of the virtual machine and/or of the database management system) 203 that are used in compiling the intermediate level software 241 into native code 244. Examples of properties that are hashed include the number of bytes in the header word of a Java object (such as the value 4), offset in an array object of a length pointer, offset of a runtime callback function pointer in a data structure of a function, values for different types of objects (e.g. array object v/s class object), maximum number of threads in the virtual machine, page size of pages in shared memory of the database management system etc. Although a single hash value is generated in some embodiments and a single comparison is performed, other embodiments generate multiple hash values (e.g. some embodiments generate two hash values as follows, one hash value for hardware properties and another hash value for software properties) and perform multiple comparisons correspondingly.

Note that a specific hashing function that is used to generate hash value 233 is not a critical aspect of the invention. As an illustrative example, one embodiment uses the FNV (Fowler/Noll/Vo) hashing function that is well known to the skilled artisan. See, for example, U.S. Pat. No. 4,588,985 that is incorporated by reference herein in its entirety, for a description of hashing functions. Note also that JDBC is a interface which can handle changes to a database management system (DBMS), but in most embodiments of the type described herein there is not such an interface which handles hardware changes or VM changes, and these changes are detected as discussed herein, by comparison of hash value(s).

Figure 3B:
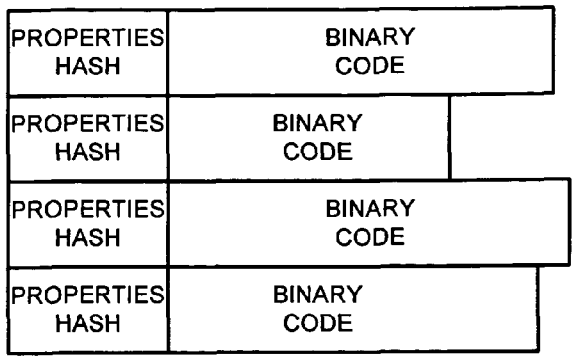
FIGS. 3B and 3C illustrate a conceptual view and an implementation view of information stored in accordance with the invention, in a database table 234 for ILL code shown in FIG. 3A.
Figure 3D:
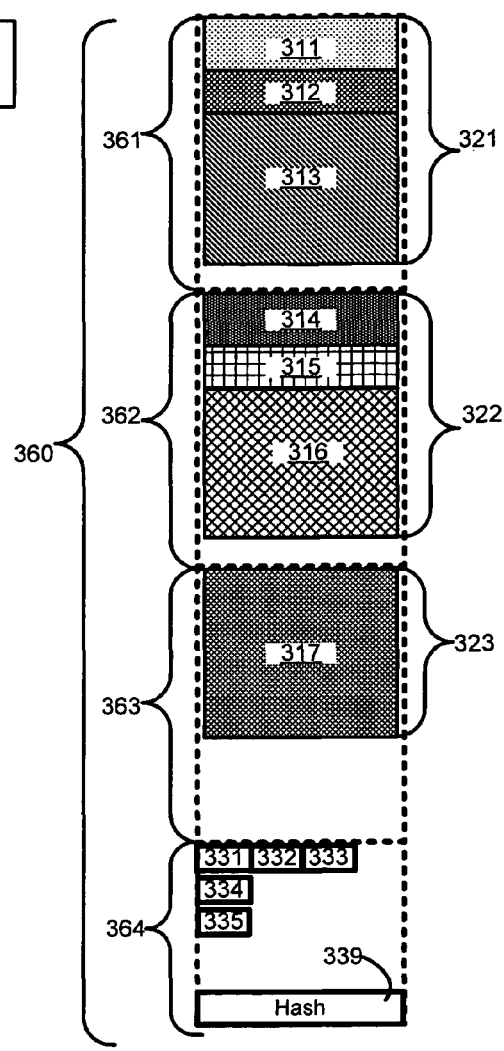
FIG. 3D illustrates in detail a memory in accordance with the invention, which holds a code bundle of the type illustrated in FIG. 3C.

Persisted native code in table 231 (which table is also referred to herein as an "executable-code table") is executed by the database processes of system 270, as long as hash value 233 that is stored in the database matches a newly-computed hash value of these properties (computed each time the database starts up, based on current VM and DBMS). This is because the match indicates continuing compatibility of persisted native code with the current VM and DBMS, even after a VM and/or DBMS change has been implemented. Accordingly, each row in executable-code table 231 (as illustrated in FIG. 3B) contains a hash value for a corresponding piece of binary code persisted in the database, so that such checking can be done. If the hash values fail to match, the native code cannot be used due to incompatibility between assumptions about properties (hardware and/or software) that are built into the native code during compilation and the current state of VM and/or DBMS. For this reason, many embodiments of system 270 actually check for the just-described match in hash values of hardware and/or software properties and load the native code into memory 230 for execution only if the result of checking is true (i.e. the properties assumed during compilation match the properties at run time). If the result of checking is false, native code in executable-code table 231 (which contains built-in assumptions about properties that were hashed) is marked invalid, and database process 217 performs interpreted execution of the ILL software 241 until it is eventually re-compiled (in due course) when the predetermined condition is again satisfied.

Note that in many embodiments, the native code in executable-code table 231 of database 230 is invalidated on a method-by-method basis. Accordingly, methods that do not use properties of VM and/or DBMS which have been changed (e.g. page size in DBMS shared memory may be changed from 32 KB to 64 KB) can be used without re-compilation even after a change in VM and/or DBMS which changes unused properties. The change of properties (or lack of change) is detected by comparison of the hash values of hardware and/or software properties before and after the change (to VM and/or DBMS). When the native code of persisted methods does use a changed property of VM and/or DBMS, the hash values will not match, and hence the corresponding native code (for which the hash values do not match) is invalidated (and discarded).

Although an illustration of a property change that may require re-compilation has been given in the previous paragraph to be "page size" in DBMS shared memory, any other property change may be taken into account in this manner, depending on the embodiment. For example, in some embodiments, a properties hash encompasses chip-specific features that may or may not be used by native code in executable-code table 231 of database 230. One illustrative embodiment supports two generations of x86-based processors: (a) a newer x86 processor having circuitry for multimedia extensions (called "SSE") on chip which cause the compiler to generate newer (and faster) instructions for the newer x86 processor, and (b) an older x86 processor lacking the SSE circuitry. Accordingly, native code in table 231 for any given method may or may not contain SSE instructions, depending on not only its functionality but also depending on the target architecture for which the code was compiled. Since not all x86 processors have SSE circuitry, this illustrative embodiment guards against the possibility that native code compiled and persisted using a newer computer containing SSE circuitry is not later on transferred to and loaded into an older computer that lacks SSE circuitry. To guard against this possibility, the illustrative embodiment encodes as a hardware property in the hash value of hardware properties, for methods that use SSE instructions, a number which indicates that SSE circuitry is required at runtime. When methods compiled to use SSE circuitry are loaded into an older computer that lacks SSE circuitry, then a properties check to match hash values fails, and the native code for this method is discarded. However, for methods that do not use SSE instructions, the properties check passes, and persisted forms of such methods are loaded into and executed by the older computer (even without SSE instructions).

Figure 3C:
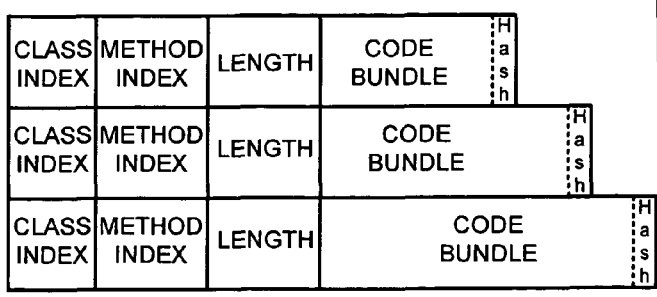

To enable a method to be invalidated independent of another method, some embodiments persist each method in its own row in executable-code table 231. Specifically, in the embodiments shown in FIG. 3C, executable-code table 231 includes a column for "method index" which is separate and distinct from the column for a "class index" and hence even if a first method of a class is invalidated a second method of the same class may not be invalidated and thus the second method can be used without recompilation. Note that such method-level invalidation cannot be implemented if a database table which stores the hash values uses a single row (and hence a single hash value) for all methods of a class.

In some embodiments, the persisted native code in executable-code table 231 is also invalidated when a new version of ILL software is stored into the database 230. Specifically, in order for any ILL software to be used in interpreted execution or for the corresponding native code to be used without compilation by a database process, it is first necessary in these embodiments to load the ILL software via the database kernel process 210 which optionally performs security or other checks on the ILL software and then stores it in a column of table 234 of database 230. Storing of ILL software into table 234 is similar or identical to storing functions currently available in any database management system which supports storing of objects in a database, such as stored PL-SQL procedures.

One embodiment of computer 200 uses a "loadjava" utility supported in Oracle 10gR1, and available from Oracle Corporation of Redwood Shores, Calif. This utility stores each class of the ILL software its own row in table 234 (also called "ILL code table"), and as a result each class has a unique object identifier. In this illustrative embodiment, the object identifier is used as an index into the ILL code table 234. In several embodiments, a dependency manager (not shown) in the database management system 270 automatically resolves dependencies of the new class being stored in table 234 to invalidate any pre-existing dependent classes. When the new class is marked as valid, its storing into database 230 is completed and database management system 270 invokes the virtual machine. The virtual machine (in database kernel process 210) re-resolves dependencies and automatically loads into database 230 updated versions of the ILL software which contain any dependent classes. The virtual machine also invalidates any native code of the dependent classes, which are eventually re-compiled, as noted above.

Note that the above-described invalidation of dependent classes (and discarding of native code) makes it safe to persist natively compiled code. Specifically, these acts preclude the possibility of running persisted native code for an old version of a method (or a method that was compiled against an old version of a dependent class). For example, if a class A depends on a class B, and if a new version of ILL code for class B is being stored into the database, then process 210 discards from the database any pre-existing native code for class B and also marks a bit indicating class A as being invalid. Thereafter, when a process 217 needs to use class A for the first time in a database call, then the just-described bit is checked and if it indicates that class A is invalid then the dependency manager checks if this is the first use of class A in the current session and if so discards any pre-existing native code for class A and re-resolves class A (at which time the new version of class B's ILL code gets used).

Note that although two database tables, namely executable-code table 231 and ILL code table 234 have been shown in FIG. 3A and discussed above, respectively used to store the two forms of each class (i.e. native code and ILL software) in database 230, other embodiments may use other database structures, such as two columns in a single database table. Moreover, although FIG. 3A and the related description herein assumes that database 230 is a relational database, other embodiments may use another kind of database, such as a hierarchical database.

Figure 4A:
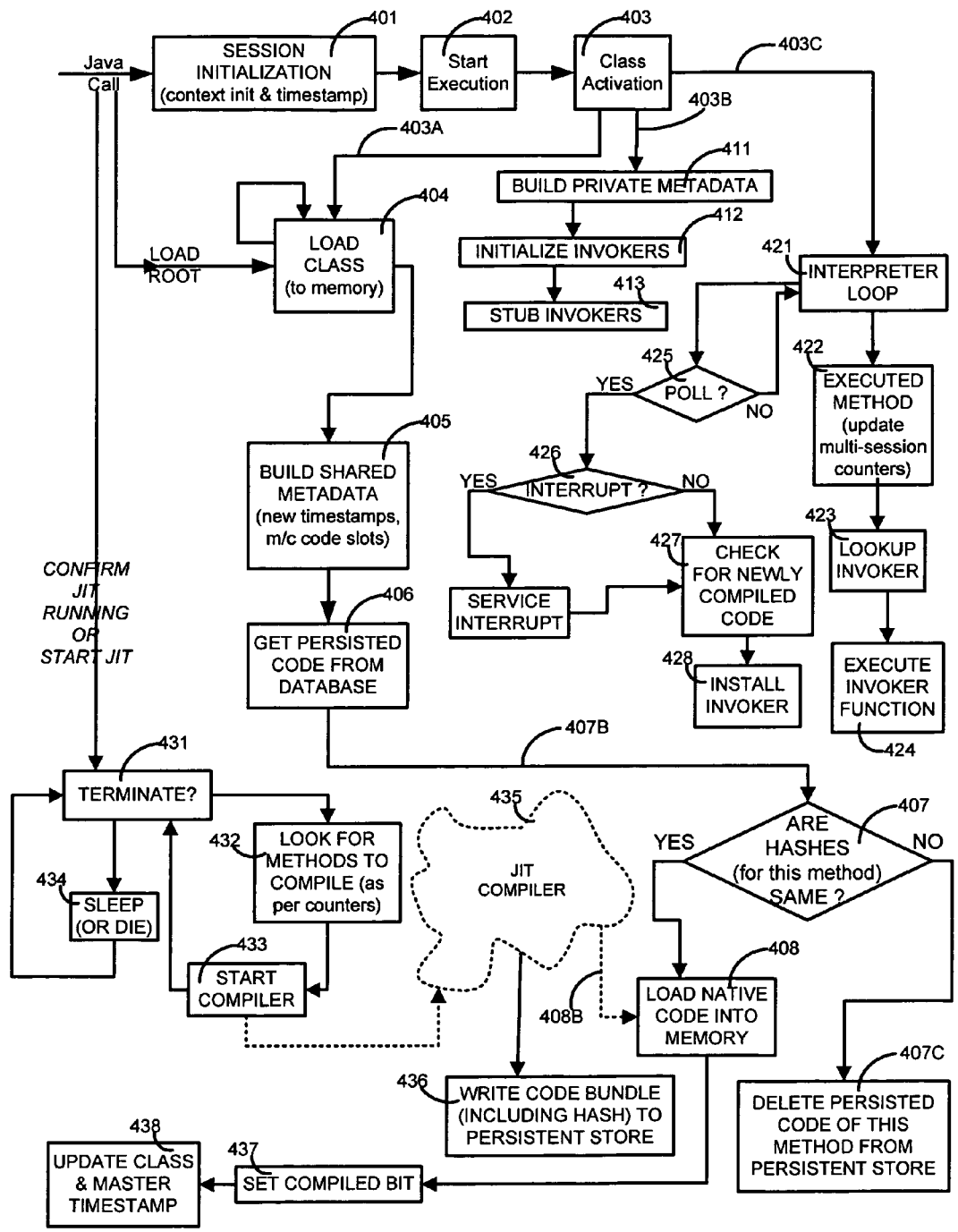
FIG. 4A illustrates, in a flow chart, a method that is executed in certain embodiments to use compiled code when available instead of interpreted execution.

In an illustrative embodiment shown in FIG. 4A a Java session context is initialized in an act 401, e.g. various data structures such as the above-described time-stamp is initialized for the session. Next, in act 402, execution starts and every time that a class is used for the first time in the session, it is activated as per act 403. When a class is activated, the computer takes branch 403A and checks if the class is already loaded in memory, as per act 404. If the class is not present in memory then the computer does load call backs for it, wherein the computer builds the in-memory format for it which is the build shared meta data (as per act 405).

When the computer loads the metadata for a class into memory, it loads all the information that is shared in the class object memory, and part of this information is the method structure, and if there is persisted native code for a given method in the database the computer retrieves that native code from the database (as per act 406). After retrieval of the native code from the database, that native code is loaded into memory (as per act 408) as described in further detail in FIG. 4C. After act 408, the computer then performs act 437 wherein the compiled bit is set, followed by updating time stamps 305 and 306 in act 438. Note that in some embodiments, prior to act 408 of loading native code into memory, a hash value that has been newly computed (on startup of the database) is checked with the hash value associated with the native code (in act 407) to ensure conformity in properties of VM/DBMS between compile time and run time. After performance of act 407, the native code for the method is either successfully loaded in shared memory or rejected (and deleted as per act 407C), and then the computer returns to act 405 which is performed for every method in the given class that is being loaded. So, acts 406 and 407 can be done multiple times, depending on the number of methods in the given class (so the computer goes through each method to load its native code if that method's native code was persisted).

After loading of a given class is completed in act 404, that class is activated in act 403 (the computer's return to act 403 occurs because the function call is completed by a return to the calling function). After the given class is activated, the computer takes branch 403B and builds private metadata for that class as per act 411. As a part of building the private metadata, the computer initializes software called "invokers" (as per act 412) and installs the invokers (as per act 413). Note that at this stage the invokers are merely "stubs" because they invoke the interpreter to interpret bytecodes of the corresponding method. After act 403 is completed for all the classes that need to be activated, then as per branch 403C an interpreter loop is started as per act 421.

The interpreter loop in act 421 executes methods for the current session, as per act 422. As noted above, a multi-session counter as well as a session-private counter for each method are both incremented, at an appropriate time (e.g. on beginning execution and/or when a backward branch is taken). Each time the computer begins executing a method, it initially interprets byte codes for that method. If the computer needs to execute another method, it looks up the invoker (as per act 423), and then executes the invoker function (as per act 424). As noted above, when the interpreter is executing, it polls. When polling, the computer checks for database interrupt conditions (as per act 426) and also checks if there is newly compiled code (as per act 427). If there is newly compiled code available, then the computer installs an invoker to use the newly compiled code (as per act 428). On completion of execution of the invoker function, the computer returns to executing any other methods in the current call and if no other methods remain, then the call ends.

During an actual compilation process (via JIT), when the computer initially starts a call, the computer makes a quick check to see if the JIT process is already running (this embodiment uses only one JIT process per database instance). The JIT process could already be running or alternatively the computer could be executing the very first session in a database instance in which case the JIT process is not already running and if so the first session spawns the JIT process. In the context of the JIT process, there is a loop as per act 431. This loop looks for methods to compile as per act 432. If there are methods to be compiled, then the compiler is started as per act 433 and the compiler then compiles the methods.

When the compiler is finished, the JIT returns to the loop 431 which then goes to sleep as per act 434. So the computer awakens every so often and if there is no code to be compiled it goes back to sleep but alternatively if there is code to be compiled it returns to act 432 which looks for the methods to be compiled based on the counters. After a method has been compiled by JIT compiler 435, the computer loads the native code into memory as per act 408 (via branch 408B). The computer stores the native code resulting from compilation into a persistent store (such as a database) as shown by act 436, which in turn is followed by returning to the JIT compiler 435.

Figure 4B:
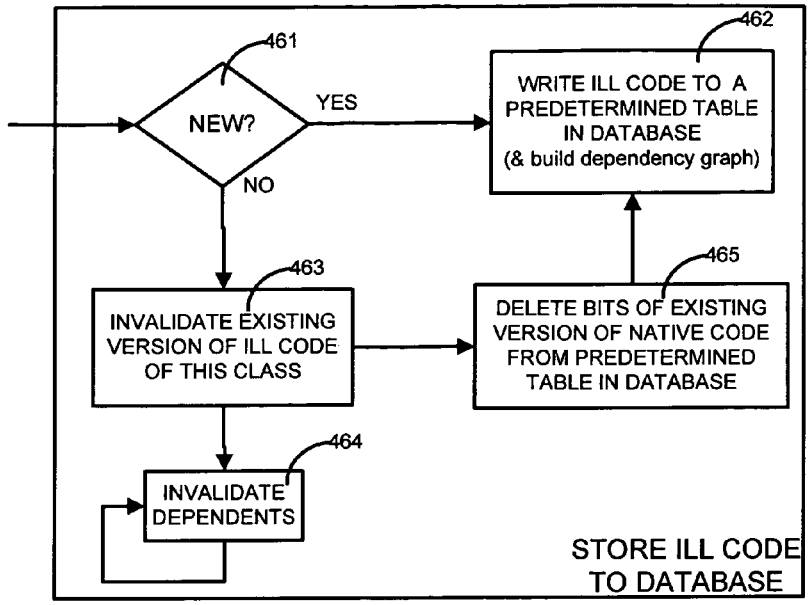
FIG. 4B illustrates, in a flow chart, a method used in some embodiments to store into a database, software (such as a Java class) expressed in an intermediate level language (obtained by compilation from a program expressed in a high level language).
Figure 4C:
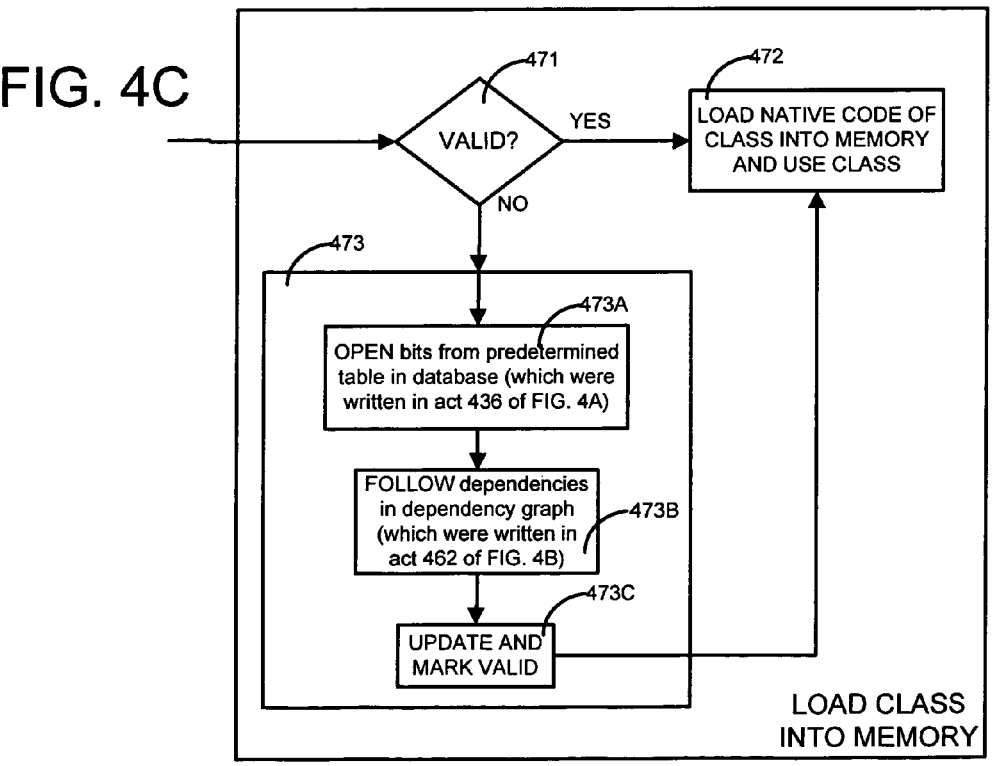
FIG. 4C illustrates, in a flow chart, a method that is performed in certain embodiments, to load into memory for interpretation and optional dynamic compilation in a virtual machine (VM) of a DBMS, an appropriate form (native code v/s intermediate level language code) of a Java class from a database (stored therein by the method of FIG. 4B).

FIGS. 4B and 4C illustrate two kinds of operations during which two kinds of invalidations are performed in some embodiments of the invention. Specifically, FIG. 4B illustrates storing of ILL software by kernel process 210 into database 230 (FIG. 3A), during which operation any pre-existing versions of the software being stored are invalidated, and any dependencies thereof are also invalidated. Briefly, the kernel process 210 checks if the class to be stored is new (i.e. not found in table 234) and if so creates metadata (such as a unique object identifier) and writes the class file into a new row in table 234. When any class is first stored in table 234, it's native code in table 231 is marked as invalid (and thereby invalidated and no longer used).

Specifically, FIG. 4B illustrates how a class (in the form of ILL software) is stored into the database by a kernel process 210, which invalidates any pre-existing versions of the class, and any dependencies thereof. When storing a class, the computer first determines if the class is new (as per act 461), by checking if the class is not found in table 231 in the database, and if so the computer writes (in act 462) the bits of this class (such as a Java "class" file) into a new row in table 231 and also builds a dependency graph. If the class being stored is not new, then the computer invalidates an old version of this class in table 234 as per act 463 and also invalidates all of the dependents in table 234 as per act 464 (based on the dependency graph which should also pre-exist). Then the computer returns to act 463 and goes to act 465 to delete the bits of the old version of this class from the persistent store, e.g. the predetermined table 231 in the database. Then the computer goes to act 462 to write the new version of this class. When any class (in the form of ILL software) is first stored in table 234, it is marked as having invalid native code, so that kernel process 210 compiles the ILL software in future (in a lazy fashion, as and when necessary). Note that database store operation 211 performs a call back to the virtual machine, to resolve dependencies when storing a class into table 234 of the database, e.g. by parsing the Java class file to identify its constant pool and then transitively resolving each class reference in the constant pool. During the checking for interdependent methods, operation 211 builds a dependency chart which is stored, for future use.

FIG. 4C illustrates how the native code of a class from the database is loaded into memory for execution (see act 408 in FIG. 4A). Loading into memory requires in-memory structures for the class to be built, and as a part of this loading operation code for the method (ILL and/or native) is also brought into memory. For all classes, when they are loaded into memory, the ILL code for each method is loaded. Additionally, if any of the ILL methods have native code persisted in table 231, an attempt is made to load the native code into memory. In order to do this, the hash values stored into the persistent store at the time of compilation of the method must match the corresponding hash values at run time. This hash check in addition to dependency management (discussed next) is key to avoid execution of native code that has become stale (due to a new version of an ILL form of the same method).

Any process 217 may make a database request specifying a class to be loaded into memory 220 for use in execution (by supplying the unique object identifier of the method). In response, the computer first checks if the class is marked valid (by performing act 471) and if so then the computer simply loads the native code of the class and its metadata from table 231 into memory (as per act 472) and then uses the class, for example by executing machine instructions of a method in the native code in memory. If the class is marked not valid, then the computer opens this class from table 231 and re-validates the class, e.g. again resolves the class as per act 473. Specifically, in act 473, the computer fetches ILL software of this class from table 234 of the database (as per act 473A), follows any dependents in the dependency graph (as per act 473B), and updates the dependents and marks them valid (as per act 473C) and then proceeds to act 472 (described above). In act 473A if ILL software is not found in table 234 or is found marked invalid in table 234, the computer fetches the ILL software from outside the database, e.g. from a predetermined address in the file system.

Note that in act 473B, the virtual machine re-resolves the class being loaded into memory (for execution) by checking its existence in executable-code table 231, and transitively resolving every class (and method) referenced therein, and marking each class (and method) that is found as valid in executable-code table 231. After all dependencies are resolved, the virtual machine copies the executable native code of the class from table 231 into shared memory, for native execution by any process 217. As noted above, stale software for any class is invalidated based on the dependency graph.

Note that in many embodiments of the invention, the interpreter is able to transfer control to and receive control from native code. Note that transfer of control between natively compiled code and interpreted code is a standard feature, e.g. as described in U.S. Pat. No. 7,032,216 granted to Dmitry Nizhegorodov, which patent is hereby incorporated by reference herein in its entirety. In this patent, Nizhegorodov states the interpreter supports an execution model that mixes byte-interpreted and natively compiled classes. Thus, routines in translated code may call routines that are interpreted, and interpreted routines may call translated code routines, thereby providing call interoperability. In a similar manner, when a method has been compiled by compilation process 210 (FIG. 3A) of the type described above, and when the native code 244 is ready for execution, the interpreter knows how to arrange the stack frame to jump into that method and start using it and also how to accept being jumped back to when the compiled code finishes execution.

Note that database system 270 may be implemented in some embodiments by use of a computer (e.g. an IBM PC) or workstation (e.g. Sun Ultra 20) that is programmed with a database application, such as the database program "Oracle 10gR1" available from Oracle Corporation of Redwood Shores, Calif. Such a computer can be implemented by use of hardware that forms a computer system 500 as illustrated in FIG. 5. Specifically, computer system 500 includes a bus 502 (FIG. 5) or other communication mechanism for communicating information, and a processor 505 coupled with bus 502 for processing information.

Computer system 500 also includes a main memory 506, such as a random access memory (RAM) or other dynamic storage device, coupled to bus 502 for storing information and instructions to be executed by processor 505. Main memory 506 also may be used for storing temporary variables or other intermediate information during execution of instructions to be executed by processor 505. Computer system 500 further includes a read only memory (ROM) 504 or other static storage device coupled to bus 502 for storing static information and instructions for processor 505. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 505. Another type of user input device is cursor control 516, such as a mouse, a trackball, or cursor direction keys for communicating direction information and command selections to processor 505 and for controlling cursor movement on display 512. This input device typically has two degrees of freedom in two axes, a first axis (e.g., x) and a second axis (e.g., y), that allows the device to specify positions in a plane.

As described elsewhere herein, incrementing of multi-session counters, shared compilation for multiple sessions, and execution of compiled code from shared memory are performed by computer system 500 in response to processor 505 executing instructions programmed to perform acts of the type described above which are contained in main memory 506. Such instructions may be read into main memory 506 from another computer-readable medium, such as storage device 510. Execution of instructions contained in main memory 506 causes processor 505 to perform the process steps described herein. In alternative embodiments, hard-wired circuitry may be used in place of or in combination with software instructions to implement an embodiment of the type illustrated in FIGS. 4A, 4B and 4C. Thus, embodiments of the invention are not limited to any specific combination of hardware circuitry and software.

The term "computer-readable medium" as used herein refers to any medium that participates in providing instructions to processor 505 for execution. Such a medium may take many forms, including but not limited to, non-volatile media, and volatile media. Non-volatile media includes, for example, optical or magnetic disks, such as storage device 510. Volatile media includes dynamic memory, such as main memory 506.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge as described hereinafter.

Various forms of computer readable media may be involved in carrying the above-described instructions to processor 505 to implement an embodiment of the type illustrated in FIGS. 4A, 4B and 4C. For example, such instructions may initially be carried on a magnetic disk of a remote computer. The remote computer can load such instructions into its dynamic memory and send the instructions over a telephone line using a modem. A modem local to computer system 500 can receive such instructions on the telephone line and use an infra-red transmitter to convert the received instructions to an infra-red signal. An infra-red detector can receive the instructions carried in the infra-red signal and appropriate circuitry can place the instructions on bus 502. Bus 502 carries the instructions to main memory 506, in which processor 505 executes the instructions contained therein. The instructions held in main memory 506 may optionally be stored on storage device 510 either before or after execution by processor 505.

Computer system 500 also includes a communication interface 515 coupled to bus 502. Communication interface 515 provides a two-way data communication coupling to a network link 520 that is connected to a local network 522. Local network 522 may interconnect multiple computers (as described above). For example, communication interface 515 may be an integrated services digital network (ISDN) card or a modem to provide a data communication connection to a corresponding type of telephone line. As another example, communication interface 515 may be a local area network (LAN) card to provide a data communication connection to a compatible LAN. Wireless links may also be implemented by communication interface 515. In any such implementation, communication interface 515 sends and receives electrical, electromagnetic or optical signals that carry digital data streams representing various types of information.

Network link 520 typically provides data communication through one or more networks to other data devices. For example, network link 520 may provide a connection through local network 522 to a host computer or to data equipment operated by an Internet Service Provider (ISP) 526. ISP 526 in turn provides data communication services through the world wide packet data communication network 524 now commonly referred to as the "Internet". Local network 522 and network 524 both use electrical, electromagnetic or optical signals that carry digital data streams. The signals through the various networks and the signals on network link 520 and through communication interface 515, which carry the digital data to and from computer system 500, are exemplary forms of carrier waves transporting the information.

Computer system 500 can send messages and receive data, including program code, through the network(s), network link 520 and communication interface 515. In the Internet example, a server 530 might transmit a code bundle through Internet 524, ISP 526, local network 522 and communication interface 515. In accordance with the invention, one such downloaded set of instructions implements an embodiment of the type illustrated in FIGS. 4A-4C. The received set of instructions may be executed by processor 505 as received, and/or stored in storage device 510, or other non-volatile storage for later execution. In this manner, computer system 500 may obtain the instructions in the form of a carrier wave.

Numerous modifications and adaptations of the embodiments described herein will be apparent to the skilled artisan in view of the disclosure.

Accordingly numerous such modifications and adaptations are encompassed by the attached claims.

What is claimed is:

1. A computer-implemented method of executing machine instructions, the method comprising:
   storing into a column of a first table of a relational database, software expressed in an intermediate level language (ILL);
   interpreting the ILL software in a virtual machine in a relational database management system used to access the relational database;
   operating a compiler in the relational database management system, to receive the ILL software as input and to emit native code comprising said machine instructions;
   storing the native code emitted by the compiler in a second table of the relational database, wherein the second table is distinct from the first table;
   storing in the relational database an indicator of a plurality of properties required to execute the native code;
   checking if said indicator stored in the relational database matches a new indicator of said plurality of properties;
   executing said machine instructions in the native code emitted by the compiler, via the virtual machine in the relational database management system, if a result of said checking is true; and
   marking the native code as invalid if said result of said checking is false.

2. The method of claim 1 wherein:
   said checking is performed at run time, when a need arises to execute the native code.

3. The method of claim 1 further comprising:
   using a process of the relational database management system to automatically build a dependency graph.

4. The method of claim 3 further comprising:
   using the dependency graph to invalidate dependent methods if said result of said checking is false.

5. The method of claim 1 wherein:
   said plurality of properties comprises at least a first property related to said virtual machine, and at least a second property is related to a CPU performing said executing.

6. The method of claim 1 wherein:
   said operating of the compiler is performed only when at least one predetermined condition is satisfied.

7. The method of claim 6 wherein:
   said predetermined condition is met when a number of times of execution of the ILL software exceeds a preset threshold.

8. The method of claim 1 wherein:
   said second table comprises a column for a method index and another column for a class index.

9. One or more non-transitory computer-readable storage devices comprising instructions that when executed by a computer cause said computer to:
   store into a column of a first table of a relational database, software expressed in an intermediate level language (ILL);
   interpret the ILL software in a virtual machine in a relational database management system used to access the relational database;
   operate a compiler in the relational database management system, to receive the ILL software as input and to emit native code comprising said machine instructions;
   store the native code emitted by the compiler in a second table of the relational database, wherein the second table is distinct from the first table;
   store in the relational database an indicator of a plurality of properties required to execute the native code;
   check if said indicator stored in the relational database matches a new indicator of said plurality of properties;
   execute said machine instructions in the native code emitted by the compiler, via the virtual machine in the relational database management system, if a result of said checking is true; and
   mark the native code as invalid if said result of said checking is false.

10. The one or more non-transitory computer-readable storage devices of claim 9 wherein:
    said instructions to check are executed at run time, when a need arises to execute the native code.

11. The one or more non-transitory computer-readable storage devices of claim 9 wherein the instructions further cause the computer to:
    use a process of the relational database management system to automatically build a dependency graph.

12. The one or more non-transitory computer-readable storage devices of claim 9 wherein:
    said plurality of properties comprises at least a first property related to said virtual machine, and at least a second property is related to a CPU in said computer.

13. An apparatus including a non-transitory computer-readable storage device storing machine instructions, the apparatus comprising:
    a relational database comprised on said non-transitory computer-readable storage device, wherein an entry in a column in a first table in the relational database comprises software expressed in an intermediate level language (ILL);

means for interpreting the ILL software in a virtual machine in a relational database management system used to access the relational database;

means for operating a compiler in the relational database management system, to receive the ILL software as input and to emit native code comprising said machine instructions;

means for storing the native code emitted by the compiler in a second table in the relational database, wherein the second table is distinct from the first table in the relational database;

means for storing in the relational database an indicator of a plurality of properties required to execute the native code;

means for checking if said indicator stored in the relational database matches a new indicator of said plurality of properties;

means for executing said machine instructions in the native code emitted by the compiler, via the virtual machine in the relational database management system, if a result of said checking is true; and means for marking the native code as invalid if said result of said checking is false.

14. The apparatus of claim 13 wherein:

means for checking operates at run time, when a need arises to execute the native code.

15. The apparatus of claim 13 further comprising:

means for using a process of the relational database management system to automatically build a dependency graph.

16. The apparatus of claim 13 wherein:

said plurality of properties comprises at least a first property related to said virtual machine, and at least a second property is related to a CPU.

* * * * *